United States Patent Office 2,831,890
Patented Apr. 22, 1958

2,831,890

PREPARATION OF BETA-ALANINE AND ALKYL SUBSTITUTED BETA-ALANINE

Roger F. Kleinschmidt, John E. Mahan, and Sam H. Pitts, Jr., Bartlesville, Okla., assignors to Phillips Petroleum Company, a corporation of Delaware No Drawing. Application August 1, 1955
Serial No. 525,821

13 Claims. (Cl. 260—534)

This invention relates to an improved process for the preparation of β-alanine. More particularly it relates to an improved process for the preparation of β-alanine from ethylene cyanohydrin.

Beta-alanine has been prepared in the past by various methods, some of which have resulted in satisfactory yields while other methods obtain only moderate yields. Beta-alanine has been also prepared by the reaction of ethylene cyanohydrin and ammonium hydroxide but even to obtain yields of 50 to 60 percent it was necessary to concentrate the reaction mixture and rework the residue obtained. Attempts have been made to produce β-alanine by the reaction of strong ammonia with acrylonitrile but the over-all yield of β-alanine is low due in part to formation of a considerable quantity of side reaction materials. Another prior method produces β-alanine by contacting acrylamide with a strongly basic catalyst which necessitates the addition of an inhibitor since the acrylamide readily undergoes a free radical-induced polymerization. Other prior methods for the production of β-alanine require expensive reagents, special equipment, and processes involving numerous and tedious steps.

In accordance with the present invention, it has been found that β-alanine can be readily prepared by contacting ethylene cyanohydrin with an alkaline catalyst and hydrolyzing the resulting polymeric product to produce β-alanine in high yields and high purity.

An object of this invention is to provide β-alanine from ethylene cyanohydrin, a relatively inexpensive starting material.

Another object is to provide a process for the production of β-alanine in high yields and high purity.

A further object is to provide a process for the production of β-alanine without the necessity of isolating or concentrating the intermediate polymer prior to hydrolysis.

A still further object is to provide a process for the production of β-alanine without the necessity of employing a polymerization inhibitor or concentrating the reaction mixture and reworking the residue obtained.

Other objects, advantages, and features will become apparent to those skilled in the art from the following disclosure, discussion, and appended claims.

Beta-alanine is a particularly important amino acid which can be readily prepared by the process of this invention. It is an important intermediate in the preparation of the vitamin pantothenic acid, and calcium pantothenate, the latter being a valuable vitamin health supplement in chicken feed and the like. Accordingly, the primary advantage of this invention is to provide a commercially feasible process for the production of this compound in a high degree of purity and in high yields. The starting material of this process, ethylene cyanohydrin, is commercially available and less expensive than acrylamide which has been employed in a prior method, and it will not undergo vinyl polymerization as will acrylamide.

When operating in accordance with the process of this invention, ethylene cyanohydrin is first polymerized by heating it in the presence of a strongly basic catalyst. It is generally preferred that the polymerization step be effected in an essentially anhydrous system but it is not necessary that any particular precautions be taken to ensure this anhydrous condition since water can be tolerated in the system up to a maximum of about 10 percent based on the ethylene cyanohydrin.

Representative strongly basic catalysts which are useful in the practice of this invention include quaternary ammonium hydroxides and alkali metals and their derivatives, the alkali metal selected from the group consisting of sodium, potassium, rubidium and cesium. These representative catalysts include sodium hydroxide, potassium hydroxide, rubidium hydroxide, cesium hydroxide, sodium methoxide, sodium ethoxide, potassium butoxide, sodamide, potassium amide, sodium hydride, sodium borohydride, potassium hydride, rubidium hydride, cesium hydride, sodium, potassium, benzyltrimethylammonium hydroxide, tetramethylammonium hydroxide, and the like. In general, the amount of catalyst employed will be in the range between 0.5 and 15 weight percent, based on ethylene cyanohydrin, and preferably in the range of 2 to 10 weight percent.

The polymerization step may be effected at atmospheric pressure or in a closed system such as in an autoclave under autonomic pressure. While it is generally preferred that the polymerization step be effected in the presence of an inert diluent, it is not necessary that such a material be present. Inert diluents applicable in the practice of this invention include hexane, heptane, octane, benzene, toluene, dibutyl carbitol, dioxane, dibutyl ether, diphenyl ether, tert-amyl alcohol, pyridine, quinoline, and the like. The amount of diluent employed will generally be in the range between 1 and 10 volumes per volume of ethylene cyanohydrin; however, as hereinbefore stated, it is not mandatory that a diluent be employed.

The temperature at which the polymerization step is carried out will be dependent upon various factors, such as the activity of the catalyst, the particular diluent employed, etc. In general, the temperature will be in the range of 85–125° C. and can be maintained in this range by suitable cooling means if necessary. While higher temperatures can be employed, it is ordinarily unnecessary to operate in this manner. The reaction is exothermic generally around 85–100° C.

The time for the polymerization step will also be dependent upon various considerations, such as the amount of ethylene cyanohydrin employed, the activity of the catalyst, the amount of diluent, the temperature, etc. The exothermic reaction is generally complete in about 5–15 minutes but heating may be continued, in the range of 75–150° C., for a period in the range between 0.5 and 5 hours.

Although the hydrolysis step can be carried directly on the reaction mixture, for economical reasons a polymer which is not appreciably soluble in the diluent can be separated by filtration, decantation, or centrifugation. In the event that the polymer is soluble in the inert diluent, a satisfactory separation can be made by evaporation of the diluent. If the polymer is separated it is generally a dry, crystalline, pale yellow, nonhygroscopic solid. However the particular method of separating the polymeric product from the reaction mixture will be apparent to those skilled in the art and the above methods of separation are obviously illustrative and are not necessarily limited by the details set forth.

The polymeric product obtained by the practice of this invention was investigated and it was found that its compositions differed from that of β-alanine. Although both the polymeric product and β-alanine were found to be soluble in water and, in general, were insoluble in organic solvents, the β-alanine obtained melted sharply at 195–196° C., while the polymeric product remained unchanged when heated to 250–260° C. A Van Slyke nitrogen determination, effective only for primary amine groups, resulted in a nearly theoretical nitrogen content of 15.7 percent for β-alanine. However, Van Slyke determinations of a sample of purified polymeric product, whose ash content had been reduced to 0.06 percent, yielded only 0.34 percent nitrogen. Similarly, elemental and infrared spectral analyses showed grossly different values for the polymeric product and β-alanine.

An advantage of the present invention is that the hydrolysis step can be carried out without the necessity of preliminarily isolating or concentrating the polymer. The hydrolyzing agent employed can be either a mineral acid, such as sulfuric acid, hydrochloric, nitric, or phosphoric acid, or hydrolysis can be carried out in the presence of an alkali metal hydroxide. The preferred amount of hydrolyzing agent to be employed is at least an equivalent amount of acid or base based on the theoretical yield of β-alanine. The preferable hydrolyzing agent to be employed is sulfuric acid in a concentration of about 10–50 weight percent. The hydrolysis step can be carried out by refluxing the polymer-hydrolyzing agent mixture for a period in the range between 1 and 10 hours or until complete hydrolysis is effected, i. e., until the polymer has been converted completely to β-alanine. If the hydrolysis step is carried out in a closed system, the temperature will be in the range of 75–150° C. while if carried out by refluxing at atmospheric pressure it will be the temperature of reflux. When acid hydrolyzing agents are employed, polymers and products are soluble in the aqueous acid and clear solutions are obtained. When alkali metal hydroxides are employed as the hydrolyzing agents the product resulting from the hydrolysis step will be the alkali metal salt of β-alanine.

The method of recovery of β-alanine will depend upon the particular hydrolyzing agent employed in the hydrolysis step. In the case of sulfuric acid, the reaction mixture is diluted, if ncessary, and neutralized to a pH of 7 with barium or calcium hydroxide. The precipitate of barium sulfate or calcium sulfate is filtered, washed, and the clear filtrate evaporated to dryness. If not previously removed, it is desirable to remove the diluent before precipitation of barium sulfate. The β-alanine obtained is crystallized from a suitable solvent, such as methanol, dried and stored.

The invention will be further illustrated in connection with the following specific examples. It should be understood, however, that the examples are for the purpose of illustration only and the invention is not limited to the details set forth therein.

*Example I*

A one-liter stainless steel autoclave was charged with 50 grams of ethylene cyanohydrin, 3 grams of potassium hydroxide, and 300 cc. (258 grams) of toluene. The autoclave was purged with nitrogen, closed, and heated to 90–92° C., at which point the reaction became exothermic. The temperature increased rapidly to 112° C. and quickly subsided. Heating was continued at 105–115° C. for 1.5 hours to complete the reaction. The reaction mixture was cooled and a hard, yellow, solid was separated by filtration. The solid product was pulverized, washed twice with ether to remove excess solvent. The polymer which was recovered weighed 46 grams.

To 20 grams of the polymeric product, prepared, as described above, 80 grams of 50 weight percent sulfuric acid was added and the mixture was refluxed about 6 hours. A clear yellow solution was obtained. The mixture was diluted with about 2 volumes of water, neutralized to pH 7 with a hot solution of barium hydroxide, filtered, and the precipitate was washed with water. The combined filtrates were evaporated to a syrup which on cooling became a slightly moist, light yellow solid. Trituration with methanol yielded 14 grams of pure β-alanine, melting point 195–196° C., or a 70 weight percent yield based on the polymer. The yield was 64.5 weight percent based on the ethylene cyanohydrin.

Three other materials, benzyltrimethylammonium hydroxide, a 30 percent aqueous solution of sodium hydroxide, and sodium metal, were similarly tried as catalysts for the polymerization of ethylene cyanohydrin instead of potassium hydroxide. In each case an exothermic reaction was observed at a temperature between 90° C. and 100° C. and a water-soluble polymer was formed. When a 28 percent aqueous solution of ammonium hydroxide was tried as a catalyst, the reaction was not exothermic and no polymer was formed.

*Example II*

Ethylene cyanohydrin was polymerized in the manner described in Example I except that 3 grams of sodium hydroxide was used in place of potassium hydroxide. From 50 grams of ethylene cyanohydrin, 47.6 grams of polymer was obtained, or a 95.2 weight percent yield. Hydrolysis of this polymer in the manner described in Example I gave a high yield of pure β-alanine, melting point 195–196° C.

*Example III*

A one-liter stainless steel autoclave was charged with 50 grams of ethylene cyanohydrin, 3 grams of sodium methoxide, and 200 cc. of toluene. The autoclave was purged with nitrogen, closed, and heated to 96–112° C., during which time the reaction became exothermic. Heating was continued at 125–130° C. to complete the reaction. The reaction mixture was cooled and a solid material was separated by filtration. The solid product was pulverized, and washed twice with ether to remove excess solvent. The polymer which was recovered weighed 46 grams. It was hydrolyzed as described in Example I to give about a 65 weight percent yield of pure β-alanine based on ethylene cyanohydrin.

The present invention is essentially concerned with the preparation of β-alanine by contacting ethylene cyanohydrin with a strongly basic catalyst and hydrolyzing the resulting polymer to obtain β-alanine. Similar preparations, however, can be carried out in which cyanohydrins and alkyl-substituted cyanohydrins other than ethylene cyanohydrin are contacted with a strongly basic catalyst and subsequently hydrolyzing the polymeric product to produce the corresponding amino acids.

While specific examples have been set forth for illustrative purposes, it should be understood that reasonable variation and modification is possible within the scope of the foregoing disclosure.

Having described our invention, we claim:

1. The process of preparing an amino acid selected from the group consisting of beta-alanine and alkyl-substituted beta-alanine which comprises contacting a corresponding cyanohydrin selected from the group consisting of ethylene cyanohydrin and alkyl-substituted ethylene cyanohydrin with a strongly basic catalyst, adding a hydrolyzing agent to the polymeric product so obtained, and heating until said product is hydrolyzed.

2. The process of preparing beta-alanine which comprises contacting ethylene cyanohydrin with a strongly basic catalyst selected from the group consisting of quaternary ammonium hydroxides, alkali metal, and alkali metal hydroxides, methoxides, amides, hydrides and borohydrides, said alkali metal being selected from the group consisting of sodium, potassium, rubidium, and cesium, adding a hydrolyzing agent to the polymeric material so obtained, and heating until said material is hydrolyzed.

3. The process according to claim 2 in which said hydrolyzing agent is an aqueous solution of an acid.

4. The process according to claim 2 in which said hydrolyzing agent is an aqueous solution of an alkali metal hydroxide.

5. The process according to claim 2 in which said catalyst is present in the amount between 0.5 and 15 weight percent, based on ethylene cyanohydrin.

6. The process according to claim 2 in which said catalyst is sodium hydroxide.

7. The process according to claim 2 in which said catalyst is potassium hydroxide.

8. The process according to claim 2 in which said catalyst is benzyltrimethylammonium hydroxide.

9. The process according to claim 2 in which said catalyst is sodium metal.

10. The process according to claim 2 in which said catalyst is sodium methoxide.

11. The process of preparing beta-alanine which comprises contacting ethylene cyanohydrin with a strongly basic catalyst at a temperature to effect polymerization, adding a hydrolyzing agent to the polymeric product so obtained, and heating by refluxing at atmospheric pressure until said product is hydrolyzed.

12. The process of preparing beta-alanine which comprises contacting ethylene cyanohydrin with a strongly basic catalyst at a temperature in the range of 85–125° C., adding a hydrolyzing agent to the polymeric material so obtained, and heating at a temperature in the range of 75–150° C.

13. The process of preparing beta-alanine which comprises contacting, in a closed vessel, ethylene cyanohydrin with a strongly basic catalyst in an inert diluent, adding a hydrolyzing agent to the polymeric material so obtained, and heating until said material is hydrolyzed.

References Cited in the file of this patent
UNITED STATES PATENTS

| | | |
|---|---|---|
| 2,364,538 | Kirk et al. | Dec. 5, 1944 |
| 2,672,480 | Matlack | Mar. 16, 1954 |
| 2,734,081 | Boatright | Feb. 7, 1956 |